United States Patent [19]

Nelson

[11] 4,424,183
[45] Jan. 3, 1984

[54] DESTRUCTIBLE CORE STRUCTURE AND METHOD FOR USING SAME

[75] Inventor: Mark A. Nelson, Salt Lake City, Utah

[73] Assignee: Baker International Corporation, Orange, Calif.

[21] Appl. No.: 395,094

[22] Filed: Jul. 6, 1982

[51] Int. Cl.³ .............................................. B28B 7/34
[52] U.S. Cl. ...................................... 264/221; 249/61; 264/255; 264/316; 264/317; 264/DIG. 44
[58] Field of Search ............... 264/DIG. 44, 221, 255, 264/314, 316, 317; 428/542.8, 454, 480; 249/61-63; 156/155

[56] References Cited

U.S. PATENT DOCUMENTS

| | | | |
|---|---|---|---|
| 132,299 | 10/1872 | Lightbody, Jr. | 428/454 |
| 349,315 | 9/1886 | Nye | 264/DIG. 44 |
| 2,217,734 | 10/1940 | Dreyfus | 264/DIG. 44 |
| 2,280,074 | 4/1942 | Halsall | 249/61 X |
| 3,136,831 | 6/1964 | Zinn | 264/316 X |
| 3,692,551 | 9/1972 | Weaver | 249/61 X |
| 4,155,970 | 5/1979 | Cassell | 428/913 X |

Primary Examiner—Henry F. Epstein
Attorney, Agent, or Firm—Trask & Britt

[57] ABSTRACT

A destructible core is formed from a frangible plastic shell filled with inert ballast. The core is used for forming complex cavities in the production of cast resin parts.

7 Claims, 4 Drawing Figures

DESTRUCTIBLE CORE STRUCTURE AND METHOD FOR USING SAME

BACKGROUND OF THE INVENTION

1. Field

This invention relates to molding techniques, and is specifically directed to a ballasted destructible core.

2. State of the Art

Cast elastomeric resinous parts are widely used for industrial products, such as machine housings. Castable resins can be formed into large pieces with thick sections through the use of relatively inexpensive molds and auxiliary processing equipment. The resinous plastics employed as casting materials are normally liquid at casting temperature, and are poured into a mold shaped to the outer contours of the part to be formed. Once introduced into the mold, the resin is cured, or hardened, usually by heat or through a chemical cross-linking reaction, to form a solid article which retains the shape of the mold. The article is then removed from the mold by destroying the mold, by splitting the mold into two or more components or by simply lifting the article from the mold cavity.

For applications requiring a solid cast part, conventional casting procedures are readily applicable. If the part includes a hollow interior, a core structure, which is shaped as the desired internal cavity, is positioned appropriately inside the mold, and the cast part is formed by pouring liquid resin around the core. When curing is complete, the core is removed from the casting. This procedure is simple for parts configured to permit easy withdrawal of the core. However, parts with complex internal cavities require the use of similarly complex cores. Such cores must either be constructed for collapsing and withdrawal (an expensive alternative) or they must be destructible to facilitate removal. Although preformed foundry cores, which can be destroyed for removal from the casting by chemical or mechanical means such as vibration, chipping or abrasive blasting are widely used to form complex internal passages and cavities in metal castings, such cores are not practical for use in resinous casting facilities. A problem experienced with cores in casting procedures generally is the tendency of the core to be displaced by its natural buoyancy when the casting material is introduced to the mold.

This invention provides a novel destructible core structure for producing cast resinous parts having an internal cavity of complex shape. This invention further provides a novel method for producing cast resinous parts with complex internal cavities through the use of a destructible core ballasted to overcome the buoyant effect of resin introduced into the mold during the casting procedure.

BRIEF SUMMARY OF THE INVENTION

The present invention is directed to a novel core structure comprising a relatively thin plastic shell filled with a flowable ballast material, such as sand. This core structure is formed by coating the internal surfaces of a mold having the desired core shape with a thin layer of a relatively inexpensive resin, filling the mold with a ballast material and then spreading another layer of resin over the material at the open end of the mold to complete an envelope or shell around the ballast material. The resin is then cured, for example, in an oven, and the completed core is removed from the mold.

This novel core structure is particularly useful when employed in a method for producing a cast resinous part having a complex internal cavity. A core structure is first made, as described, in the shape of the internal cavity to be produced in the cast part. The core is then inserted in the appropriate position in the casting mold so that casting resin poured into the mold flows around the core. When the liquid resin enters the mold, the weight of the ballast material overcomes the buoyant effect of the resin and the core remains in its proper position throughout the casting procedure. Usually, a complex cavity will communicate through one or more openings in the walls of the part, leaving some portion of the core exposed.

The casting resin is cured, and the cast part is removed from the casting mold with the core still in place within a cured resinous mass. The core is then removed by rupturing the plastic shell. This rupturing may be achieved by mechanical action; for example, by striking the core shell with a hammer, and allowing the ballast material to drain from the shell through the access opening provided by the previously described region of core exposure. The empty plastic shell is hollow, and thus collapsible, and can be peeled from the surfaces of the internal cavity of the part through the access opening. The resulting finished cast part is left with an empty internal cavity.

DETAILED DESCRIPTION OF THE INVENTION

Figure 1:
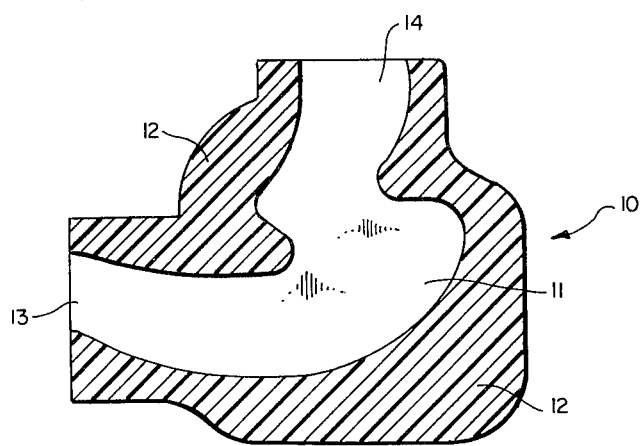
FIG. 1 is a cross-sectional view of a typical cast resinous part having a complex internal cavity formed by a core of the present invention.

The cast part 10 illustrated in cross-section in FIG. 1 is typical of the items which can be produced in accordance with the invention. The complex shaped cavity 11 of part 10 contains several turns and back drafts and connects a relatively small inlet opening 13 with an outlet opening 14. Cavity 11 is enveloped by a mass of cast resin 12.

Figure 4:
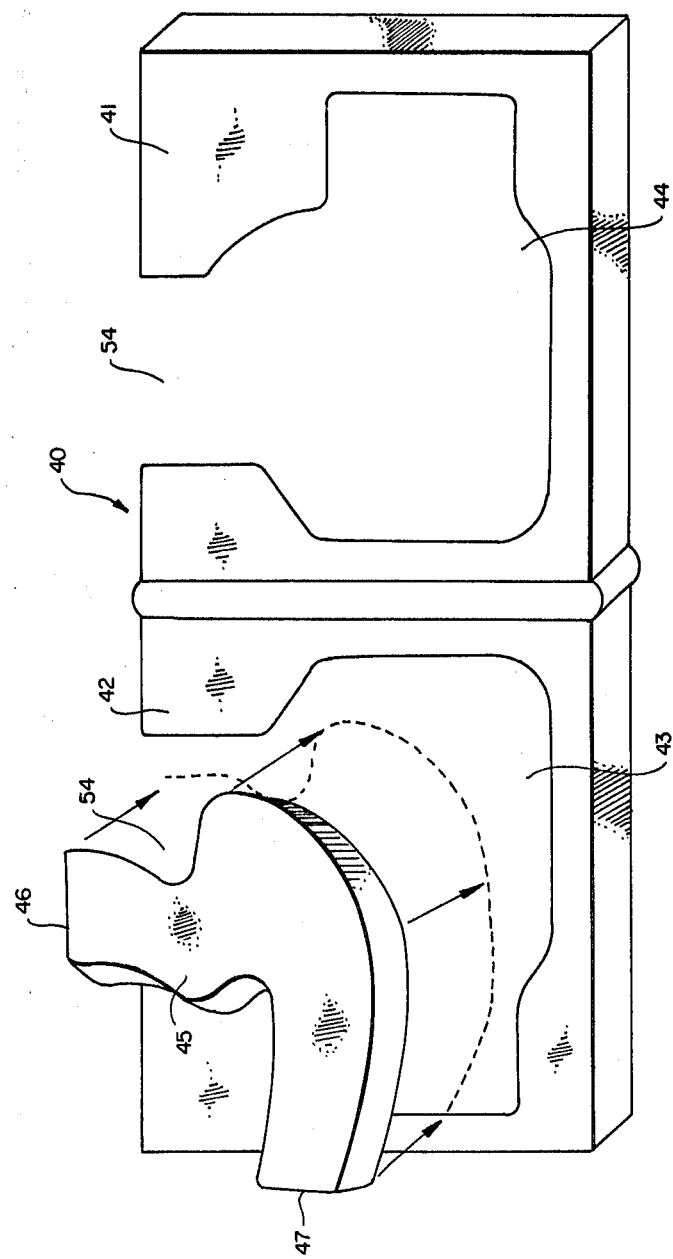
FIG. 4 is a perspective view of an open split casting mold illustrating the positioning of a core structure within a mold cavity.

Using techniques known in the art, the outer shape of cast part 10 can be readily formed in a conventional casting mold, for example, the book mold 40 illustrated in FIG. 4. It can be seen, however, that the complex shape of cavity 11 would make it virtually impossible to withdraw, even a collapsible core from the cast part 10 through either of the openings 13 or 14. Accordingly, a destructible core must be used in this instance. Although various expedients are known to register the core in its desired position within the mold 40, the configuration of the cavity 43 does not lend itself to a locking engagement of the core adequate to resist the effects of buoyancy as the cavity is filled with resin.

Figure 2:
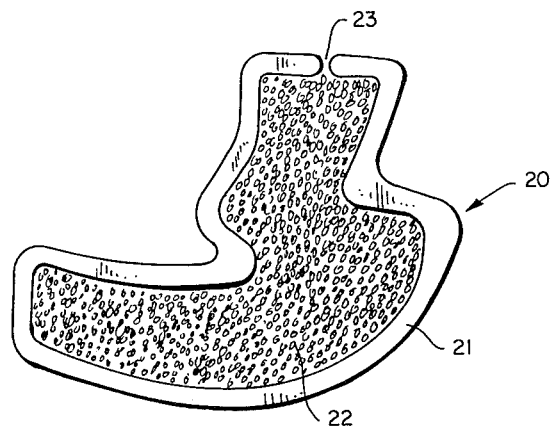
FIG. 2 is a cross-sectional view of a core structure of the present invention useful for producing the part of FIG. 1.

Turning to the cross-sectional illustration in FIG. 2 of a core 20 of the present invention, such as would be used to produce cavity 11 in part 10, it can be seen that the core comprises a plastic shell 21 filled with an inert flowable ballast material 22. This ballast material is most preferably sand, but can be any granular solid or liquid having sufficient density to overcome the buoyant effect of the resin when it is introduced into the mold during the casting procedure. The ballast should also be sufficiently flowable to drain from the shell 21 when the shell is ruptured. Because the core must remain within the part during the curing step involving heat or chemical reaction, the ballast material must also be inert and not interact with the plastic shell 21 or decompose to any substantial degree during exposure to these curing conditions. As shown in FIG. 2, shell 21 may contain one or more vent holes 23 to allow the escape of any volatiles (such as steam) which may be produced by the ballast material during the curing process.

Figure 3:
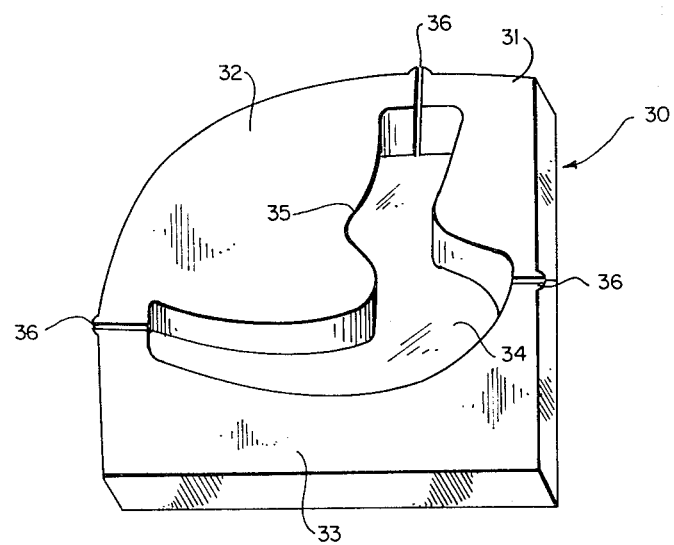
FIG. 3 is an overhead perspective view of a mold in which a core structure of the present invention can be formed.

Cores of the present invention are typically produced in open-top split molds such as the one illustrated in FIG. 3. Mold 30 comprises three sections 31, 32 and 33, respectively which, when joined and held together, form a cavity 34 having the desired core shape. To form the shell of the core structure, the internal surfaces of cavity 34 are first coated with a thin layer of the resin to form three walls of the shell. This plastic resin must, of course, be compatible with the casting resin used for producing the cast part. It should also be capable of forming a sturdy, yet frangible, shell. Polyester resins have been found to be particularly useful because they are relatively inexpensive yet easily molded into a sturdy shell. An example of a suitable polyester resin is High Heat Surface Coat Resin 4022, marketed by Ren, Division of Ciba-Geigy, Fountain Valley, Calif. The resin is applied as a coating thick enough to produce a rigid shell for containing the ballast material and for retaining its molded shape, but thin enough to be readily ruptured by conventional mechanical means, such as by striking with a hammer or crowbar, when the core is to be removed from the casting.

The coated cavity 34 is filled with ballast material to the level of the top edge 35 of the cavity. A layer of the plastic resin is then applied over the ballast material 22 in the cavity and over the edge 35 to form the last wall which completes the shell containing the ballast material. The mold is then placed in a oven to cure the resin, thereby to form a rigid core structure having the shape of cavity 34. Mold 30 is split into three sections 31, 32 and 33 at the joints 36 to facilitate the removal of the shell from the mold.

As previously indicated, the core structures of the present invention are adapted for use in casting molds such as, for example, the mold 40 shown in FIG. 4. Mold halves 41 and 42 of mold 40 have cavities 43 and 44 in their respective faces, each of which define one-half of the external shape of the cast part to be formed in the mold. When mold halves 42 and 43 are joined together, the cavity produced holds the casting resin introduced into the mold through gate 54 at the top of the mold. A core 45 produced in accordance with this invention is shown in FIG. 4 as being placed between the mold halves 42 and 41 in position to be contained within the mold cavity when the mold halves are joined. The top edge 46 of core 45 is positioned in the center of gate 54 so that there is space around it for the introduction of resin into the cavity formed by mold halves 41 and 42. When the resin is introduced into the mold through gate 54, it surrounds the core in the mold cavity and completely envelopes the core except for the edge positioned in gate 54. The ballast material in the core is of sufficient density to overcome the buoyant effect produced by the resin entering into the mold and the core remains in its designated position throughout the casting procedure.

The resin within the mold cavity is cured in the conventional manner prescribed for that resin. Most preferred resins, such as polyurethane and polyester resins, are cured by the application of heat in an oven. Other suitable casting materials, such as certain epoxy resins, can be cured at room temperature with the aid of a chemical hardener. Still others, such as certain phenolic compounds, require both heat and a chemical hardener or catalyst for curing.

After curing, mold halves 42 and 41 are split, and the cast part is removed with the core 45 still in place in the center of the mass 12 of cast resin which forms the part. However, edges 46 and 47 of core 45, which will create the openings 13 and 14 shown in part 10 of FIG. 1, are exposed (not covered with resin). It is therefore possible in the illustrated instance to rupture the shell of core 45 at either edge 46 and/or 47 by puncturing it with a suitable tool. When the shell is ruptured, the ballast material may be poured out, leaving an empty plastic shell lining the cavity 11 of the cast part. This empty shell is distortable or collapsible, and can be peeled or chipped from the cavity walls for removal through one of the openings 13, 14.

Because certain changes may be made in the procedures described in this disclosure without departing from the essence of the invention, reference herein to details of the illustrated embodiment is not intended to limit the scope of the appended claims, which themselves recite those features regarded as essential to the invention.

I claim:

1. A method for producing a cast resinous part with a complex internal cavity, comprising:
   forming a destructible core structure from a rigid shell configured as said complex cavity and filled with an inert flowable ballast material;
   positioning said core structure in the appropriate position within the cavity of a casting mold adapted to produce said cast part, thereby providing a casting space the configuration of said part;
   introducing casting resin into said casting space, thereby to envelope said core structure, leaving at least one access opening through said cavity space in contact with said core;
   curing the resin to solidify the resinous mass around said core structure;
   removing the solidified resinous mass from the mold with the core structure in place;
   rupturing the shell of said core structure, and removing the ballast material from the shell through said access opening; and
   removing the shell of the core structure from the internal cavity of the resinous mass through said access opening.

2. A method according to claim 1 wherein the core structure is formed by coating a thin layer of resin on the inner surfaces of an open top mold which defines the shape of the core structure, filling the coated mold with said ballast material, applying a layer of resin over the ballast material at the open top of the mold to complete the plastic shell around said ballast material, curing the resin to solidify said shell, and removing said shell filled with ballast material from the mold.

3. A method according to claim 1 wherein the destructible core structure is preformed and comprises a thin plastic shell with an exterior configuration approximately the size and shape of said complex internal cavity and a hollow interior filled with said inert flowable ballast material.

4. A method according to claim 3 wherein said ballast material is sand.

5. A method according to claim 3 wherein said plastic shell is constructed from a polyester resin.

6. A method according to claim 2 wherein said ballast material is sand.

7. A method according to claim 2 wherein said plastic shell is constructed from a polyester resin.

* * * * *

UNITED STATES PATENT OFFICE
CERTIFICATE OF CORRECTION

Patent No. 4424183           Dated January 3, 1984

Inventor(s) Mark A. Nelson

It is certified that error appears in the above-identified patent and that said Letters Patent are hereby corrected as shown below:

On the title page, change the title from "Destructible Core Structure and Method for Using Same" to ---Method for Producing a Cast Resinous Part Using a Destructible Core---;

Signed and Sealed this

Tenth Day of July 1984

[SEAL]

Attest:

GERALD J. MOSSINGHOFF

Attesting Officer      Commissioner of Patents and Trademarks